United States Patent
Zhou et al.

(10) Patent No.: US 10,285,239 B2
(45) Date of Patent: May 7, 2019

(54) PROTECTION CIRCUIT FOR SHORT CIRCUIT OF LED POWER SUPPLY

(71) Applicants: Self Electronics Co., Ltd., Ningbo, Zhejiang (CN); Wanjiong Lin, Ningbo, Zhejiang (CN); Self electronics USA Corporation, Norcross, GA (US)

(72) Inventors: Xiaoyong Zhou, Zhejiang (CN); Xiaobo You, Zhejiang (CN); Xuejun Zhou, Zhejiang (CN); Xiyong Zhou, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 18 days.

(21) Appl. No.: 15/629,701

(22) Filed: Jun. 21, 2017

(65) Prior Publication Data

US 2017/0374719 A1    Dec. 28, 2017

(30) Foreign Application Priority Data

Jun. 22, 2016  (CN) .......................... 2016 1 0465441

(51) Int. Cl.
  *H05B 33/08*   (2006.01)
(52) U.S. Cl.
  CPC ..... *H05B 33/0884* (2013.01); *H05B 33/0887* (2013.01); *Y02B 20/341* (2013.01)
(58) Field of Classification Search
  CPC ............ H05B 33/0842; H05B 33/0884; H05B 33/0893; H05B 33/0896
  USPC .................................................. 315/291, 127
  See application file for complete search history.

(56) References Cited

U.S. PATENT DOCUMENTS

| | | | |
|---|---|---|---|
| 9,190,830 B1* | 11/2015 | Xiong ................ | H05B 33/0887 |
| 9,723,685 B2* | 8/2017 | Kalkschmidt ...... | H05B 33/0887 |
| 2006/0012932 A1* | 1/2006 | Kitagawa ............... | H02H 3/087 |
| | | | 361/93.1 |
| 2014/0139140 A1* | 5/2014 | Yeh ........................ | G05B 24/02 |
| | | | 315/297 |

* cited by examiner

*Primary Examiner* — Douglas W Owens
*Assistant Examiner* — Amy X Yang
(74) *Attorney, Agent, or Firm* — Wang Law Firm, Inc.

(57) ABSTRACT

A protection circuit for short circuit of LED power supply includes a constant voltage source powered by the LED power supply, a constant current source powered by the LED power supply, a switching module for controlling the constant current source to turn off or turn on, and an output current detecting module for controlling the switching module to turn off or turn on. The constant current source is provided in parallel with the constant voltage source. The switching module includes a PNP type transistor connected in series to the constant current source. The output current detecting module includes a NPN type transistor, a base of the NPN type transistor being electrically connected to the output terminal of the constant voltage source, an emitter of the NPN type transistor grounding, and a collector of the NPN type transistor being electrically a base of the PNP type transistor.

6 Claims, 2 Drawing Sheets

PROTECTION CIRCUIT FOR SHORT CIRCUIT OF LED POWER SUPPLY

RELATED APPLICATION

This present application claims benefit of the Chinese Application, CN 201610465441.8, filed on Jun. 22, 2016.

BACKGROUND

1. Technical Field

The present application relates to a lighting power supply device, and more particularly to a protection circuit for short circuit of LED power supply.

2. Description of the Related Art

Light emitting diode (LED) is growing in popularity due to decreasing costs and long life compared to incandescent lighting and fluorescent lighting. Recently, a number of LED lighting apparatuses have been designed to replace the halogen apparatus, as well as other traditional incandescent or fluorescence lighting apparatuses. In some places such as exhibition halls, jewelry stores, museums, supermarkets, and some home lighting, such as large villas, will use a lot of LED lamps. Moreover, in addition to lighting equipments, such as general traffic lights, billboards, motor-lights, etc., also use light-emitting diodes as light source. As described above, for the light-emitting diodes as a light source, the advantage is power saving, and the greater brightness. Therefore, the use has been gradually common.

With the improvement of living standards and the development of smart home, more and more intelligent power is used in the LED power supply of LED lamps. General LED power supply is a constant voltage source, that is to say, the output voltage is constant, which can be connected in series with a plurality of LED lamps so as to ensure that input power of each LED lamp is constant, thereby improving the applicability and efficiency of LED power supply. However, when using the smart power, a main controller is usually loaded in the LED power supply, and a dependent controller is loaded each of the LED lamps. Therefore, the main and dependent controllers also become a load of the LED power supply. When the load is short-circuited, it not only causes energy loss, but also burns the entire LED power supply and the main and dependent controllers.

Therefore, it is necessary to provide a protection circuit for short circuit of LED power supply which makes it possible to protect the entire LED power supply and the main and dependent controllers.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout two views.

DETAILED DESCRIPTION

The present application is illustrated by way of example and not by way of limitation in the figures of the accompanying drawings. It should be noted that references to "an" or "one" embodiment in this application are not necessarily to the same embodiment, and such references mean at least one.

Figure 1:
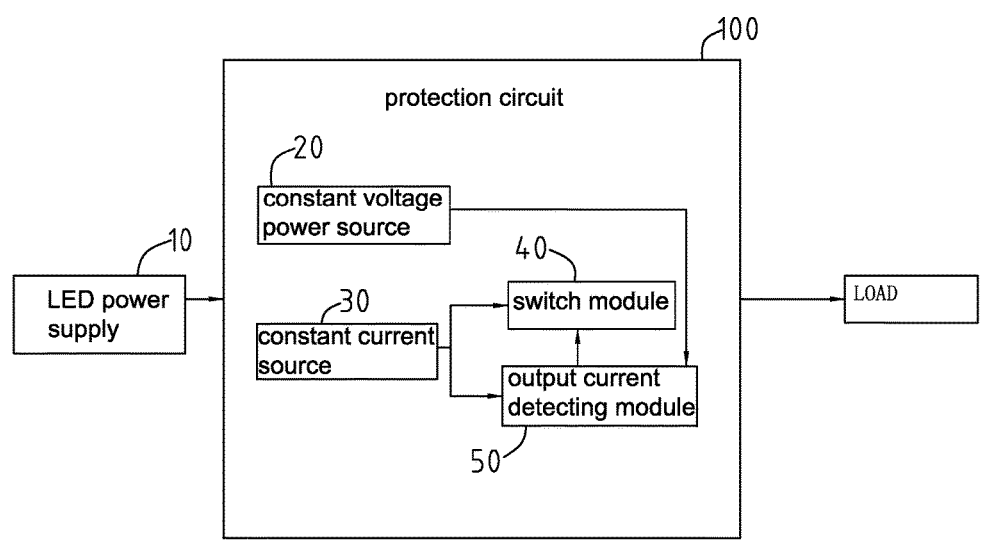
FIG. 1 is a block diagram of a protection circuit for short circuit of LED power supply according to an embodiment.
Figure 2:
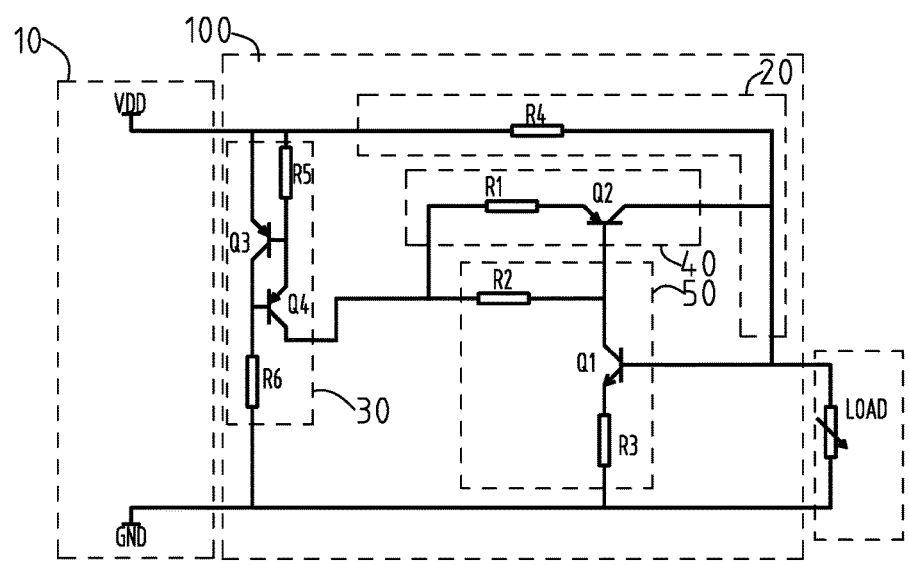
FIG. 2 is a circuit chart of the protection circuit for short circuit of LED power supply of FIG. 1.

Referring to FIG. 1 to FIG. 3, a protection circuit 100 for short circuit of LED power supply is shown. The protection circuit 100 is appended onto a LED power supply 10. An input of the LED power supply 10 is a constant voltage and the LED power supply 10 is configured for providing compliance power. The protection circuit 100 includes a constant voltage power source 20 powered by the LED power supply 10, a constant current source 30 powered by the LED power supply 10, a switch module 40 for controlling the constant current source 30 to be turned off or turned on, and an output current detecting module 50 for controlling the switch module 40 to be turned off or turned on. It is understood that the protection circuit 100 is configured for power a load, and the load is electrically connected the output terminals of the constant voltage source 20 and the constant current source 30. The load may be a LED lamp controller, such as digital addressable lighting interface (DALI) slave. It is appreciated that the load may be a LED lamp. However, since the primary function of the protection circuit 100 is protection rather than power supply, when the load is an LED lamp, the power of the LED lamp may be relatively low as in the case where the voltage drop of the LED lamp is greater that the pressure drop provided by the protection circuit 100. It is need to further explain that a main controller of the LED lamp, such as digital addressable lighting interface host, is directly connected to the LED power supply 10 and is powered thereby. Generally, the main controller may have only one, and the dependent controller may be consistent with the number of the LED lamps and more than one. And the main controller controls the work state of a number of dependent controllers so as to control the operation of the plurality of LED lamps to achieve the purpose of the intelligent control, which is well known to these skilled in the art and not described in detail.

The constant voltage source 20 can be directly connected to the output terminal of the LED power source 10. Since the output terminal of the LED power source 10 is a constant voltage, the constant voltage source 20 can be easily obtained by only connecting a wire to the LED power source 10. The constant voltage source 20 includes a first current limiting resistor R4 connected in series to the wire so as to provide suitable constant voltage. The main function of the constant voltage source 20 is to provide a starting voltage to the output current detection module 50. Moreover, when the load is not short-circuited, the constant voltage source 20 also provides a certain amount of current to the load. The detailed working principle of the constant voltage source 20 will be described later.

The constant current source 30 also may be directly connected to the output terminals of the LED power supply 10. However, the LED power supply 10 has the output of constant voltage, and it is need to transform the constant voltage into constant current by certain electron devices. In the present embodiment, the constant current source 30 includes two transistors Q3, Q4 connected in series, a resister R5 connected the transistors Q3 in parallel, a divider resister R6 connected in series to the two transistors Q3, Q4. In the present embodiment, the two transistors Q3, Q4 are PNP type transistor. An emitter of the transistor Q3 is electrically connected to a high level of the LED power supply 10, a base of the transistor Q3 is electrically connected to an emitter of the transistor Q4, and a collector of the transistor Q3 is electrically connected to a base of the transistor Q4 and grounded via the divider resister R6. One end of the resister R5 is electrically connected to the high level of the LED power supply 10 and other end thereof is electrically connected to the base of the transistor Q3. As well known, the threshold voltage of the transistor Q3 is 0.7 volts, so the output constant current I of the constant current source 30 is 0.7/R5. The constant current source 30 is provided in parallel with the constant voltage source 20. Therefore, the total current magnitude loaded on the load is the sum of the current value formed by the constant voltage source 20 and the current value of the constant current source 30.

The switch module 40 includes a PNP type transistor Q2 connected in parallel to the constant current source 30, and a second current limiting resister R1 connected in parallel to the PNP type transistor Q2. An emitter of the PNP type transistor Q2, i.e., PNP type transistor is electrically connected to the constant current source 30 via the second current limiting resister R1. In special, one end of the second current limiting resister R1 is electrically connected to the collector of the transistor Q4 of the constant current source 30. A collector of the PNP type transistor Q2 is regarded as an output terminal, and is electrically connected to the load. A base of the PNP type transistor Q2 is electrically connected to the output current detecting module 50.

The output current detecting module 50 includes an NPN type transistor Q1, and two divider resisters R2 and R3. A base of the NPN type transistor Q1, i.e., NPN type transistor, is electrically connected to the output terminal of the constant voltage source 20, an emitter of the NPN type transistor Q1 grounds, and a collector of the NPN type transistor Q1 is electrically connected to the base of the PNP type transistor Q2 of the switch module 40. One of the two divider resisters R2 and R3 is connected in series between the constant current source 20 and the collector of the NPN type transistor Q1, the other is connected in series between the emitter of the NPN type transistor Q1 and ground.

Referring to FIG. 2, the operation of the protection circuit 100 is as follows. When the load is in the normal operation state, a voltage of the base of the NPN type transistor Q1 of the output current detecting module 50 is a voltage value applied the two input terminal of the load such that the NPN type transistor Q1 of the output current detecting module 50 turns on. When the NPN type transistor Q1 is turned on, a voltage of the base of the PNP type transistor Q2 of the switching module 40 is a voltage value divided by the two divider resisters R2 and R3. Therefore, the PNP type transistor Q2 is also turned on. A current on the load is composed of two parts, that is, the sum of the current value of the constant voltage source 20 and the constant current source 30.

However, when the load is short-circuited, a resistance value of the load is infinitely reduced so that the base of the NPN type transistor Q1 of the output current detecting module 50 grounds, thereby turning off the NPN type transistor Q1. When the NPN type transistor Q1 is turned off, the voltage value of the base of the PNP type transistor Q2 of the switching module 40 is 0 volt so that the PNP type transistor Q2 is also turned off by the output current detecting module 50. As a result, the current flowing through the load is only the current formed by the constant voltage source 20, and the current flowing through the load can be effectively controlled within the design requirement range so as to reduce the loss of the internal electrons of the load.

While the disclosure has been described by way of example and in terms of exemplary embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A protection circuit for short circuit of LED power supply, the output of the LED power supply being a constant voltage, comprising:
    a constant voltage source connected to the LED power supply;
    a constant current source powered by the LED power supply, the constant current source being provided in parallel with the constant voltage source;
    a switching module for controlling the constant current source to be turn off or turn on, the switching module comprising a PNP type transistor connected in series to the constant current source; and
    an output current detecting module for controlling the switching module to be turn off or turn on, the output current detecting module comprising a NPN type transistor, a base of the NPN type transistor being electrically connected to a output terminal of the constant voltage source, an emitter of the NPN type transistor grounding, and a collector of the NPN type transistor being electrically connected to a base of the PNP type transistor,
    wherein the output current detecting module comprises two divider resisters, one of the two divider resisters is electrically connected in series between the constant current source and the collector of the NPN type transistor, the other is electrically connected in series between the emitter of the NPN type transistor and ground, and the constant voltage source provides a voltage to the base of the NPN type transistor.

2. The protection circuit for short circuit of LED power supply as claimed in claim 1, wherein the protection circuit is configured for supplying power to a load, the load is electrically connected between the output terminal of the constant voltage source and the constant current source.

3. The protection circuit for short circuit of LED power supply as claimed in claim 2, wherein the load is a lamp controller, the lamp controller is a digital addressable lighting interface slave.

4. The protection circuit for short circuit of LED power supply as claimed in claim 1, wherein the constant voltage source comprises a first current limiting resister.

5. The protection circuit for short circuit of LED power supply as claimed in claim 1, wherein the switching module comprises a second current limiting resister, the second current limiting resister is electrically connected in series between the constant current source and an emitter of the PNP type transistor.

6. The protection circuit for short circuit of LED power supply as claimed in claim 1, wherein a collector of the PNP type transistor of the switching module is electrically connected to the output terminal of the constant voltage source.

* * * * *